(12) United States Patent
Yamada et al.

(10) Patent No.: US 11,386,894 B2
(45) Date of Patent: Jul. 12, 2022

(54) ELECTRONIC DEVICE, CHARGING STAND, COMMUNICATION SYSTEM, METHOD, AND PROGRAM

(71) Applicant: KYOCERA Corporation, Kyoto (JP)

(72) Inventors: Yuki Yamada, Yokohama (JP); Hiroshi Okamoto, Yokohama (JP); Joji Yoshikawa, Sagamihara (JP)

(73) Assignee: KYOCERA Corporation, Kyoto (JP)

( * ) Notice: Subject to any disclaimer, the term of this patent is extended or adjusted under 35 U.S.C. 154(b) by 169 days.

(21) Appl. No.: 16/643,501

(22) PCT Filed: Aug. 1, 2018

(86) PCT No.: PCT/JP2018/028890
§ 371 (c)(1),
(2) Date: Feb. 28, 2020

(87) PCT Pub. No.: WO2019/044344
PCT Pub. Date: Mar. 7, 2019

(65) Prior Publication Data
US 2020/0193990 A1    Jun. 18, 2020

(30) Foreign Application Priority Data

Aug. 29, 2017  (JP) .............................. JP2017-164205

(51) Int. Cl.
*G10L 15/22*  (2006.01)
*G10L 15/28*  (2013.01)

(52) U.S. Cl.
CPC ............ *G10L 15/22* (2013.01); *G10L 15/285* (2013.01); *G10L 2015/223* (2013.01)

(58) Field of Classification Search
CPC ....................................................... G10L 15/22
See application file for complete search history.

(56) References Cited

U.S. PATENT DOCUMENTS 5,730,603 A  *  3/1998  Harless .................. G09B 5/065
                                                        434/308
9,514,737 B2    12/2016  Takei et al.
(Continued)

FOREIGN PATENT DOCUMENTS

CN        103857347 A  *  6/2014  ............. A61B 3/112
EP          1050872 A2  *  11/2000  ............. G10L 15/22
(Continued)

OTHER PUBLICATIONS

Takao Mori et al.; "Negotiation System Considering Personality by State Transition Diagram and Text Classification"; The Institute of Electronics, Information and Communication Engineers Technical Report; Jan. 31, 2008; pp. 75-80; vol. 107, No. 480, NLC2007-100.

*Primary Examiner* — Feng-Tzer Tzeng
(74) *Attorney, Agent, or Firm* — Studebaker & Brackett PC

(57) ABSTRACT

An electronic device includes a controller. The controller performs a speech word analysis based on the voice of a user after performing a first voice output request. The controller estimates a comprehension level of the user, based on information linked to a word stored in the memory and a result of the speech word analysis, and then performs a second voice output request in accordance with the comprehension level of the user. When the mobile terminal configured to output the first voice and the second voice is mounted on a charging stand, the controller may perform the speech word analysis, estimate the comprehension level, and perform the second voice output request.

6 Claims, 10 Drawing Sheets

(56) References Cited

U.S. PATENT DOCUMENTS

| | | | |
|---|---|---|---|
| 2010/0171464 A1* | 7/2010 | Choi | B25J 5/00 320/114 |
| 2010/0318536 A1* | 12/2010 | Bandholz | G06F 16/90344 704/251 |
| 2013/0346496 A1* | 12/2013 | Maarek | G06Q 50/01 709/204 |
| 2014/0074473 A1* | 3/2014 | Takei | G10L 15/22 704/246 |

FOREIGN PATENT DOCUMENTS

| | | |
|---|---|---|
| JP | 2006-349836 A | 12/2006 |
| JP | 2013-154458 A | 8/2013 |
| JP | 2014-079088 A | 5/2014 |
| JP | 2014-217116 A | 11/2014 |
| JP | 2015-109764 A | 6/2015 |
| WO | 2013/038440 A1 | 3/2013 |

\* cited by examiner

Left-right direction

ELECTRONIC DEVICE, CHARGING STAND, COMMUNICATION SYSTEM, METHOD, AND PROGRAM

CROSS REFERENCE TO RELATED APPLICATION

This application claims priority to and the benefit of Japanese Patent Application No. 2017-164205 (filed on Aug. 29, 2017), the entire contents of which are incorporated herein by reference.

TECHNICAL FIELD

The present disclosure relates to an electronic device, a charging stand, a communication system, a method, and a program.

BACKGROUND

Mobile terminals such as smartphones, tablet PCs, and laptop computers are in widespread use. Mobile terminals utilize electric power stored in built-in batteries to operate. Mobile terminal batteries are charged by charging stands that supply electric power to a mobile terminal mounted thereon.

For the charging stands, improved charging functionality, downsizing, and simplified configurations have been proposed.

SUMMARY

Technical Problem

However, there is room for improvement in the functionality of electronic devices, such as a mobile terminal and a charging stand, that are used in combination.

The present disclosure provides an electronic device, a charging stand, a communication system, a method, and a program each of which has improved functionality.

Solution to Problem

An electronic device according to a first aspect of the present disclosure includes:
a controller configured to:
perform a speech word analysis based on the voice of a user after performing a first voice output request,
estimate a comprehension level of the user based on information linked to a word stored in a memory and a result of the speech word analysis, and
perform a second voice output request in accordance with the comprehension level of the user.

A charging stand according to a second aspect of the present disclosure includes:
a controller configured to:
perform a speech word analysis based on the voice of a user after performing a first voice output request,
estimate a comprehension level of the user based on information linked to a word stored in a memory and a result of the speech word analysis, and
perform a second voice output request in accordance with the comprehension level of the user.

A communication system according to a third aspect of the present disclosure includes:
a mobile terminal; and
a charging stand on which the mobile terminal can be mounted,
wherein one of the mobile terminal and the charging stand is configured to:
perform a speech word analysis based on the voice of a user after performing a first voice output request:
estimate a comprehension level of the user based on information linked to a word stored in a memory and a result of the speech word analysis: and
perform a second voice output request in accordance with the comprehension level of the user.

A method used by an electronic device according to a fourth aspect of the present disclosure includes:
performing a speech word analysis based on the voice of a user after performing a first voice output request,
estimating a comprehension level of the user based on information linked to a word stored in a memory and a result of the speech word analysis, and
performing a second voice output request in accordance with the comprehension level of the user.

A program according to a fifth aspect of the present disclosure for causing an electronic device to:
perform a speech word analysis based on the voice of a user after performing a first voice output request,
estimate a comprehension level of the user based on information linked to a word stored in a memory and a result of the speech word analysis, and
perform a second voice output request in accordance with the comprehension level of the user.

Advantageous Effect

The electronic device, the charging stand, the communication system, the method, and the program according to the present disclosure improve the functionality of the electronic device.

BRIEF DESCRIPTION OF THE DRAWINGS

In the accompanying drawings.

DETAILED DESCRIPTION

Figure 1:
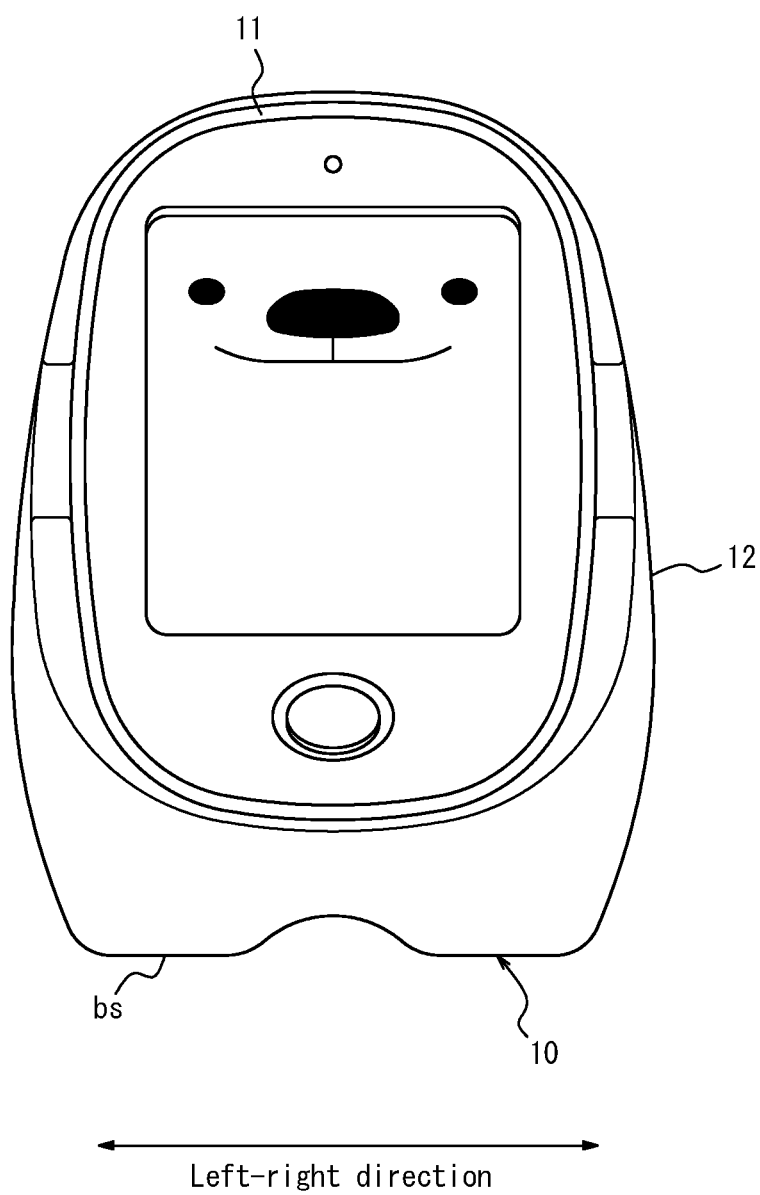
FIG. 1 is an elevation view illustrating an exterior of a communication system that includes an electronic device according to an embodiment.
Figure 2:
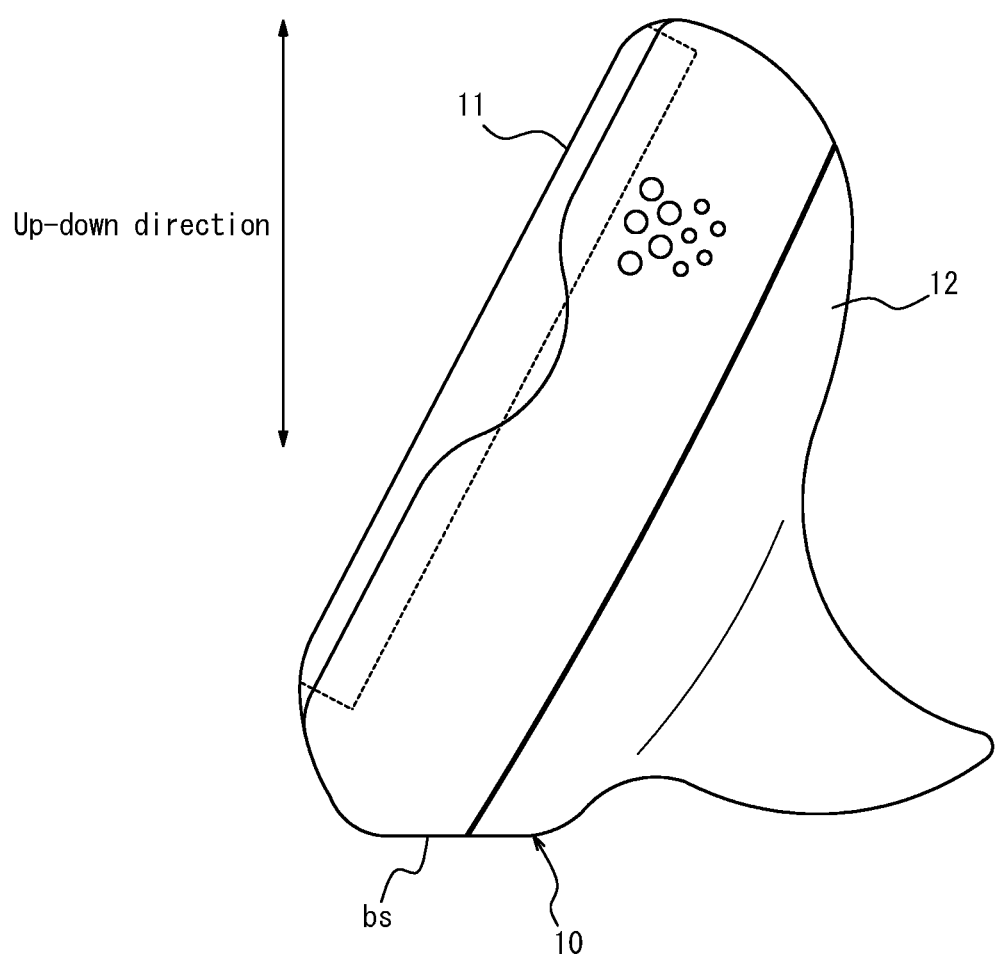
FIG. 2 is a side view of the communication system of FIG. 1.

A communication system 10 that includes a mobile terminal 11 and a charging stand 12 according to the present disclosure includes the mobile terminal 11 and the charging stand 12, as illustrated in FIG. 1 and FIG. 2. The mobile terminal 11 can be mounted on the charging stand 12. When the mobile terminal 11 is mounted on the charging stand 12, the charging stand 12 charges an internal battery of the mobile terminal 11. Also, when the mobile terminal 11 is mounted on the charging stand 12, the communication system 10 can interact with a user. At least one of the mobile terminal 11 and the charging stand 12 has a messaging function and notifies a messages for a specific user to the corresponding user.

Figure 3:
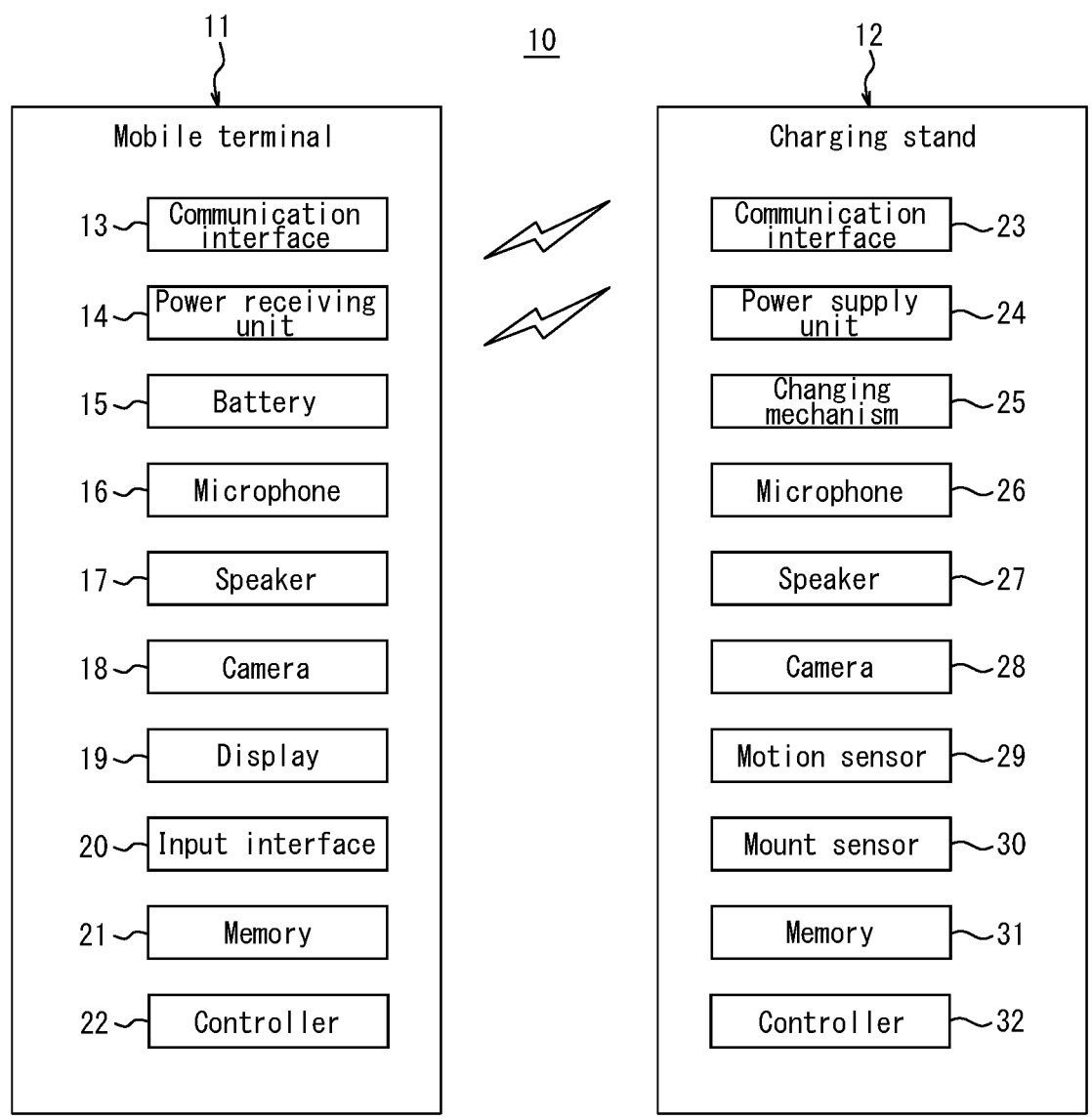
FIG. 3 is a functional block diagram schematically illustrating an internal configuration of a mobile terminal and the charging stand of FIG. 1.

The mobile terminal 11 includes a communication interface 13, a power receiving unit 14, a battery 15, a microphone 16, a speaker 17, a camera 18, a display 19, an input interface 20, a memory 21, and a controller 22, as illustrated in FIG. 3.

The communication interface 13 includes a communication interface capable of performing communication using voice, characters, or images. As used in the present disclosure, "communication interface" may encompass, for example, a physical connector, a wireless communication device, or the like. The physical connector may include an electrical connector which supports transmission of electrical signals, an optical connector which supports transmission of optical signals, or an electromagnetic connector which supports transmission of electromagnetic waves. The electrical connector may include connectors compliant with IEC60603, connectors compliant with the USB standard, connectors corresponding to an RCA pin connector, connectors corresponding to an S terminal as defined in EIAJ CP-1211A, connectors corresponding to a D terminal as defined in EIAJ RC-5237, connectors compliant with HDMI® (HDMI is a registered trademark in Japan, other countries, or both), connectors corresponding to a coaxial cable including BNC (British Naval Connector), Baby-series N Connector, or the like. The optical connector may include a variety of connectors compliant with IEC 61754. The wireless communication device may include devices conforming to various standards such as Bluetooth® (Bluetooth is a registered trademark in Japan, other countries, or both) or IEEE 802.11. The wireless communication device includes at least one antenna.

The communication interface 13 communicates with an external device that is external to the mobile terminal 11 such as, for example, the charging stand 12. The communication interface 13 communicates with the external device by performing wired or wireless communication. In a configuration in which the communication interface 13 performs wired communication with the charging stand 12, the mobile terminal 11 mounted on the charging stand 12 in an appropriate orientation at an appropriate position is connected to a communication interface 23 of the charging stand 12 and can communicate therewith. The communication interface 13 may communicate with the external device in a direct manner using wireless communication or in an indirect manner using, for example, a base station and the Internet or a telephone line.

The power receiving unit 14 receives electric power supplied from the charging stand 12. The power receiving unit 14 includes, for example, a connector for receiving electric power from the charging stand 12 via a wire. Alternatively, the power receiving unit 14 includes, for example, a coil for receiving electric power from the charging stand 12 using a wireless feeding method such as an electromagnetic induction method or a magnetic field resonance method. The power receiving unit 14 charges the battery 15 with the received electric power.

The battery 15 stores electric power supplied from the power receiving unit 14. The battery 15 discharges electric power and thus supplies electric power necessary for constituent elements of the mobile terminal 11 to execute the respective functions.

The microphone 16 detects a voice originating in the vicinity of the mobile terminal 11 and converts the voice into an electrical signal. The microphone 16 outputs the detected voice to the controller 22.

The speaker 17 outputs a voice based on the control by the controller 22. For example, when the speaker 17 performs a speech function, which will be described below, the speaker 17 outputs speech determined by the controller 22. For example, when the speaker 17 performs a call function with another mobile terminal, the speaker 17 outputs a voice acquired from the another mobile terminal.

The camera 18 captures an image of a subject located in an imaging range. The camera 18 can capture both a still image and a video image. When capturing a video image, the camera 18 successively captures images of a subject at a speed of, for example, 60 fps. The camera 18 outputs the captured images to the controller 22.

The display 19 is configured as, for example, a liquid crystal display (LCD), an organic EL (Electroluminescent) display, or an inorganic EL display. The display 19 displays an image based on the control by the controller 22.

The input interface 20 is configured as, for example, a touch panel integrated with the display 19. The input interface 20 detects various requests or information associated with the mobile terminal 11 input by the user. The input interface 20 outputs a detected input to the controller 22.

The memory 21 may be configured as, for example, a semiconductor memory, a magnetic memory, an optical memory, or the like. The memory 21 stores, for example, various information necessary for the execution of a registration operation, a speech operation, a voice recognition operation, a watching operation, a data communication operation, a telephone call operation, or the like, which will be described later. The memory 21 also stores an image of the user, user information, an installation location of the charging stand 12, external information, the content of conversations, a behavior history, local information, a specific target of the watching operation, or the like acquired by the controller 22 during the operations set forth above.

The controller 22 includes one or more processors. The controller 22 may include one or more memories for storing programs and information being calculated for use in various operations. The memory includes a volatile memory or a nonvolatile memory. The memory includes a memory independent of the processor or a built-in memory of the processor. The processor includes a general purpose processor configured to read a specific program and perform a specific function, or a specialized processor dedicated for specific processing. The specialized processor includes an application specific application specific integrated circuit (ASIC). The processor includes a programmable logic device (PLD). The PLD includes field-programmable gate array (FPGA). The controller 22 may be configured as a system on a chip (SoC) or a system in a package (SiP), in which one or more processors cooperate.

For example, when the controller 22 receives an instruction from the charging stand 12 to transition to a communication mode as will be described later, the controller 22 controls each constituent element of the mobile terminal 11 to execute various functions for the communication mode. The communication mode is a mode of the communication system 10, constituted by the mobile terminal 11 and the charging stand 12 which causes execution of an interaction with a user targeted for interaction amongst specific users, observation of the specific users, sending messages to the specific users, or the like.

The controller 22 performs a registration operation for registering a user which executes the communication mode. For example, the controller 22 starts the registration operation upon detection of an input that requires user registration and is made in respect to the input interface 20.

In the registration operation, the controller 22 transfers a registered image together with the user information associated therewith to the charging stand 12. To do so, the controller 22 determines whether the controller 22 can communicate with the mobile terminal 11.

In the registration operation, the controller 22 transfers a registered image together with the user information associated therewith to the charging stand 12. To do so, the controller 22 determines whether the controller 22 can communicate with the mobile terminal 11.

In a case in which the controller 22 cannot communicate with the charging stand 12, the controller 22 displays a message for enabling communication on the display 19. For example, when the mobile terminal 11 and the charging stand 12 are not connected to each other in a configuration in which the mobile terminal 11 and the charging stand 12 perform wired communication, the controller 22 displays a message requesting connection on the display 19. In a case in which the mobile terminal 11 and the charging stand 12 are located remote from each other and cannot communicate with each other in a configuration in which the mobile terminal 11 and the charging stand 12 perform wireless communication, the controller 22 displays a message requesting to approach the charging stand 12 on the display 19.

When the mobile terminal 11 and the charging stand 12 can communicate with each other, the controller 22 causes the mobile terminal 11 to transfer the registered image and the user information to the charging stand 12 and display an indication indicating that the transfer is in progress on the display 19. When the controller 22 acquires a notification of completion of transfer from the charging stand 12, the controller 22 causes the display 19 to display a message indicating that the initial setting has been completed.

When the communication system 10 is in transition to the communication mode, the controller 22 causes the communication system 10 to interact with a specific user by performing at least one of the speech operation and the voice recognition operation. The specific user is the user registered in the registration operation and, for example, the owner of the mobile terminal 11. In the speech operation, the controller 22 verbally outputs various information associated with the specific user from the speaker 17. The various information includes, for example, the content of a schedule, the content of a note, the sender of an e-mail, the title of an e-mail, the caller of an incoming call, and the like. Further, the various information includes, for example, learning information for the user targeted for interaction (e.g., a child) in the form of questions and answers (e.g., mathematics).

The speech content subjected to the speech operation performed by the controller 22 is changed in accordance with a comprehension level. The comprehension level indicates a depth of knowledge (a knowledge level) of the user targeted for interaction in association with a given topic or subject. The comprehension level is estimated through interactions between an interactive electronic device (e.g., the mobile terminal 11) and the user targeted for interaction. In the present embodiment, the comprehension level is estimated based on hierarchies that classify the depth of knowledge (the knowledge level) of the user and are linked to words, as will be described later by way of example. In the present embodiment, words are managed in hierarchical structures (tree structures) in accordance with the depth of knowledge in the memory. In interactions between the electronic device and the user targeted for interaction, a word itself or a subject associated with the word is used in the speech content by the electronic device.

The hierarchical structures of related words are configured such that, for example, the knowledge level is shallower (i.e., general or less difficult) as the hierarchy is higher, and the knowledge level is deeper as the hierarchy is lower (i.e., expert or more difficult). For example, in a hierarchical structure of words related to sports, "baseball" is arranged in the top hierarchy, and "Team 1" is arranged in the second top hierarchy. Also, "Player A" is arranged in the hierarchy immediately below the hierarchy of "Team 1". Estimation of the comprehension level will be described later. When, for example, the user gives a non-committal response (e.g., by simply saying "Uh-huh") to a speech that includes "Player A", the comprehension level of the user in association with "Baseball" is estimated to be not deep to the extent that "Player A" is known. Also, for example, when the user favorably responds (e.g., by saying "Player A has the top batting average in the league") to a speech that includes "Player A", it may be estimated that the user knows "Player B" in addition to "Player A".

Here, the user can set a predetermined topic, a subject, a degree of interest and the like for a speech, using the input interface 20. For example, the user can set that the user wishes to talk about "Sports" in the speech. For example, the user can set that the user wishes to immediately start an interaction associated with "Learning". Further, for example, the user can set that the user is not particularly interested in "Athletics". Such setting content (hereinafter, referred to as "setting information") is stored in, for example, in the memory 21 and can be synchronized by and shared with the charging stand 12.

In the speech operation, the controller 22 determines the content of a notification based on current time, location of the charging stand 12, a user targeted for interaction specified by the charging stand 12 as will be described later, e-mail or an incoming call received by the mobile terminal 11, a note and a schedule registered to the mobile terminal 11, voice of the user, and the content of past conversations by the user. The controller 22 drives the speaker 17 to verbally output the determined content. Here, the controller 22 acquires the estimated comprehension level to be used for the speech operation from the charging stand 12. The controller 22 adjusts the speech to be output in accordance with the knowledge level of the user, based on the comprehension level of the user. For example, the controller 22 acquires a first voice output request from the charging stand 12 as will be described later and performs a speech which includes "Player A". In a case in which the user does not favorably respond, the controller 22 acquires the comprehension level of the user and a second voice output request from the charging stand 12 as will be described later, and outputs further speech which does not include "Player A" but instead includes the content corresponds to a lower knowledge level (more general content) or a different topic. In a case in which the user favorably responds, the controller 22 acquires the comprehension level of the user and the second voice output request from the charging stand 12 as will be described later, and outputs further speech which includes alternative content associated with "Player A" (e.g., "Player A hit a home run yesterday") or content using a word at the same knowledge level as "Player A" (e.g., "Player B is not playing today").

The controller 22 determines whether the mobile terminal 11 is mounted on the charging stand 12 or removed from the charging stand 12, in order to determine the content of the speech. The controller 22 determines whether the mobile terminal 11 is mounted or removed, based on a mounting notification acquired from the charging stand 12. For example, while the controller 22 receives mounting notifications from the charging stand 12 indicating that the mobile terminal 12 is mounted, the controller 22 determines that the mobile terminal 11 is mounted on the charging stand 12. When the controller 22 stops receiving the mounting notifications, the controller 22 determines that the mobile terminal 11 is removed from the charging stand 12. Alternatively, the controller 22 may determine whether the mobile terminal 11 is mounted on the charging stand 12, based on whether the power receiving unit 14 can receive electric power from the charging stand 12, or whether the communication interface 13 can communicate with the charging stand 12.

In the voice recognition operation, the controller 22 recognizes the content spoken by the user by performing morphological analysis of a voice detected by the microphone 16. The controller 22 performs a predetermined operation based on the recognized content. The predetermined operation may include, for example, a speech operation on the recognized content as described above, a search for desired information, display of a desired image, or making a telephone call or sending an e-mail to an intended addressee. According to the present embodiment, the controller 22 transmits a response (the speech content) by a recognized user to the charging stand 12. The controller 22 may transmit the response to the charging stand 12 without processing the response, or by subdividing the response into words delimited using morphological analysis.

While the communication system 10 is in transition to the communication mode, the controller 22 stores the continuously performed speech operation and voice recognition operation described above in the memory 21 and learns the content of conversations associated with the specific user targeted for interaction. The controller 22 utilizes the learned content of the conversations to determine the content for later speech. The controller 22 may transfer the learned content of conversations to the charging stand 12.

Further, when the communication system 10 is in transition to the communication mode, the controller 22 detects the current location of the mobile terminal 11. Detection of the current location is based on, for example, an installation location of a base station during communication or the GPS incorporated in the mobile terminal 11. The controller 22 notifies the user of local information associated with the detected current location. The notification of the local information may be generated as speech by the speaker 17 or an image displayed on the display 19. The local information may include, for example, sale information for the neighborhood store.

When the input interface 20 detects a request for starting the watching operation associated with a specific target while the communication system 10 is in transition to the communication mode, the controller 22 notifies the charging stand 12 of the request. The specific target may be, for example, a specific registered user, a room in which the charging stand 12 is located, or the like.

The watching operation is performed by the charging stand 12, regardless of whether or not the mobile terminal 11 is mounted on the charging stand 12. When the controller 22 receives a notification from the charging stand 12 indicating that the specific target is in an abnormal state that is performing the watching operation, the controller 22 notifies the user to that effect. The notification to the user may be generated as voice via the speaker 17 or as a warning image displayed on the display 19.

The controller 22 performs a data communication operation to send/receive e-mail or display an image using a browser, or perform a telephone call operation, based on an input to the input interface 20, regardless of whether the communication system 10 is in transition to the communication mode.

The charging stand 12 includes a communication interface 23, a power supply unit 24, a changing mechanism 25, a microphone 26, a speaker 27, a camera 28, a motion sensor 29, a mount sensor 30, a memory 31, a controller 32, and the like.

The communication interface 23 includes a communication interface capable of performing communication using voice, characters, images, in a manner similar to the communication interface 13 of the mobile terminal 11. The communication interface 23 communicates with the mobile terminal 11 by performing wired or wireless communication. The communication interface 23 may communicate with an external device (e.g., a data server) by performing wired communication or wireless communication.

The power supply unit 24 supplies electric power to the power receiving unit 14 of the mobile terminal 11 mounted on the charging stand 12. The power supply unit 24 supplies electric power to the power receiving unit 14 in a wired or wireless manner, as described above.

The changing mechanism 25 changes an orientation of the mobile terminal 11 mounted on the charging stand 12. The changing mechanism 25 can change the orientation of the mobile terminal 11 along at least one of the vertical direction and the horizontal direction that are defined with respect to a bottom surface bs (see FIGS. 1 and 2), which is defined with respect to the charging stand 12. The changing mechanism 25 includes a built-in motor and changes the orientation of the mobile terminal 11 by driving the motor.

The microphone 26 detects a voice around the charging stand 12 and converts it into an electrical signal. The microphone 26 outputs the detected voice to the controller 32.

The speaker 27 outputs voice based on the control by the controller 32.

The camera 28 captures a subject located within an imaging range. The camera 28 includes a direction changing device (e.g., a rotary mechanism) and can capture images of the surroundings of the charging stand 12. The camera 28 can capture both still images and video. When capturing video, the camera 28 successively captures a subject at a speed of, for example, 60 fps. The camera 28 outputs captured images to the controller 32.

The motion sensor 29 is configured as, for example, an infrared sensor and detects the presence of a person around the charging stand 12 by detecting heat. When the motion sensor 29 detects the presence of a person, the motion sensor 29 notifies the controller 32 to that effect. Note that the motion sensor 29 may be configured as a sensor other than the infrared sensor such as, for example, an ultrasonic sensor. Alternatively, the motion sensor 29 may cause the camera 28 to detect the presence of a person based on a change in images continuously captured.

The mount sensor 30 of the charging stand 12 is arranged on, for example, a mounting surface for mounting the mobile terminal 11 and detects the presence or absence of the mobile terminal 11. The mount sensor 30 is configured as, for example, a piezoelectric element or the like. When the mobile terminal 11 is mounted, the mount sensor 30 notifies the controller 32 to that effect.

The memory 31 may be configured as, for example, a semiconductor memory, a magnetic memory, an optical memory, or the like. For example, the memory 31 stores an image associated with user registration, user information, and setting information acquired from the mobile terminal 11 for each mobile terminal 11 and each registered user. For example, the memory 31 stores the content of a conversation for each user acquired from the mobile terminal 11. For example, the memory 31 stores information for driving the changing mechanism 25 based on an imaging result acquired by the camera 28, as will be described later. For example, the memory 31 stores the behavior history acquired from the mobile terminal 11 for each user. Further, the memory 31 stores words that are classified into hierarchies to be used for estimation of the comprehension level of the user.

The controller 32 includes one or more processors, in a manner similar to the controller 22 of the mobile terminal 11. The controller 32 may include one or more memories for storing programs and information being calculated to be used for various operations.

The controller 32 causes the communication system 10 to maintain the communication mode at least from when the mount sensor 30 detects mounting of the mobile terminal 11 to when the mount sensor 30 detects removal of the mobile terminal 11, or until a predetermined period of time has elapsed after the detection of removal. Thus, while the mobile terminal 11 is mounted on the charging stand 12, the controller 32 can cause the mobile terminal 11 to perform at least one of the speech operation and the voice recognition operation. The controller 32 can cause the mobile terminal 11 to perform at least one of the speech operation and the voice recognition operation until the predetermined period has elapsed after removal of the mobile terminal 11 from the charging stand 12.

While the mobile terminal 11 is mounted on the charging stand 12, the controller 32 determines the presence or absence of a person in the vicinity of the charging stand 12, based on a detection result of the motion sensor 29. When the controller 32 determines that there is a person, the controller 32 activates at least one of the microphone 26 and the camera 28 such that at least one of voice or an image is detected. The controller 32 identifies a user targeted for interaction based on at least one of the detected voice and the detected image.

The controller 32 stores, in the memory 31, words which can be used in an interaction and are classified into the hierarchical structures in accordance with the depth of the knowledge, based on the setting information shared with the mobile terminal 11. The controller 32 may acquire information regarding words necessary for the estimation of the comprehension level of the user via the Internet or directly from the data server, based on the shared setting information. At this time, the controller 32 may acquire the hierarchical structure in addition to the words. Words which have been classified into hierarchies and stored in the memory 31 are synchronized by and shared with the mobile terminal 11.

After outputting the first voice output request (a first speech request) to the mobile terminal 11, the controller 32 performs the speech word analysis based on the voice of the user acquired from the mobile terminal 11. The controller 32 estimates the comprehension level of the user, based on the information (the hierarchy indicating the depth of knowledge) linked to the words stored in the memory 31, and a result of the speech word analysis. The controller 32 notifies the mobile terminal 11 of the estimated comprehension level and outputs the second voice output request (a second speech request) in accordance with the comprehension level of the user.

While the mobile terminal 11 is mounted on the charging stand 12, the controller 32 causes the camera 28 to continue to capture and searches for the face of the user targeted for interaction. The controller 32 drives the changing mechanism 25 based on a location of the face found in the image, such that the display 19 of the mobile terminal 11 is directed to the user.

When the mount sensor 30 detects mounting of the mobile terminal 11, the controller 32 starts the transition of the communication system 10 to the communication mode. Thus, when the mobile terminal 11 is mounted on the charging stand 12, the controller 32 causes the mobile terminal 11 to start execution of at least one of the speech operation and the voice recognition operation. Also, when the mount sensor 30 detects mounting of the mobile terminal 11, the controller 32 notifies the mobile terminal 11 that the mobile terminal 11 is mounted on the charging stand 12.

When the mount sensor 30 detects removal of the mobile terminal 11 or when a predetermined time has elapsed after the mount sensor 30 detects mounting of the mobile terminal 11, the controller 32 ends the communication mode of the communication system 10. Thus, when the mobile terminal 11 is removed, or when the predetermined time has elapsed after the mount sensor 30 detects mounting of the mobile terminal 11, the controller 32 causes the mobile terminal 11 to end the execution of at least one of the speech operation and the voice recognition operation.

When the controller 32 acquires the content of a conversation for each user from the mobile terminal 11, the controller 32 causes the memory 31 to store the content of the conversation for each mobile terminal 11. The controller 32 causes different mobile terminals 11 which directly or indirectly communicate with the charging stand 12 to share the content of the conversation, as appropriate. Note that the indirect communication with the charging stand 12 includes at least one of communication via a telephone line when the charging stand 12 is connected to the telephone line and communication via the mobile terminal 11 mounted on the charging stand 12.

When the controller 32 acquires an instruction to perform the watching operation from the mobile terminal 11, the controller 32 performs the watching operation. In the watching operation, the controller 32 activates the camera 28 to sequentially capture a specific target. The controller 32 extracts the specific target in the images captured by the camera 28. The controller 32 determines a state of the extracted specific target based on image recognition or the like. The state of the specific target includes, for example, an abnormal state in which the specific user falls over and does not get up or detection of a moving object in a vacant home. When the controller 32 determines that the specific target is in an abnormal state, the controller 32 notifies the mobile terminal 11 which issued the instruction to perform the watching operation that the specific target is in an abnormal state.

Figure 4:
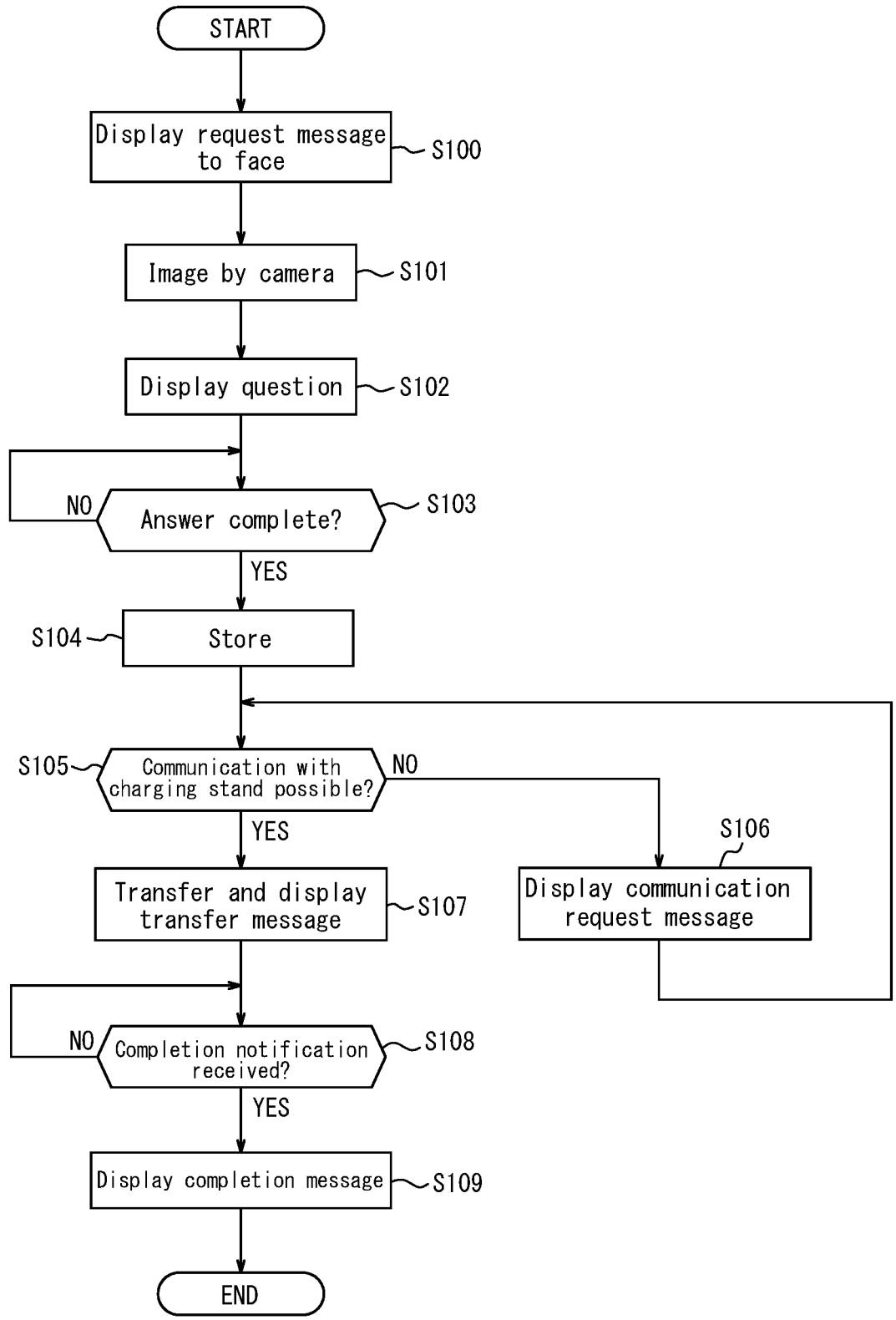
FIG. 4 is a flowchart illustrating an initial setting operation performed by a controller of the mobile terminal illustrated in FIG. 3.

Next, an initial setting operation performed by the controller 22 of the mobile terminal 11 according to the present disclosure will be described with reference to the flowchart of FIG. 4. The initial setting operation starts when the input interface 20 detects an input by the user to start the initial setting.

In step S100, the controller 22 displays a request to face the camera 18 of the mobile terminal 11 on the display 19. After the request has been displayed on the display 19, the process proceeds to step S101.

The controller 22 causes the camera 18 to capture an image in step S101. After an image is captured, the process proceeds to step S102.

The controller 22 displays a question asking the name and the attributes of the user on the display 19 in step S102. After the question has been displayed, the process proceeds to step S103.

In step S103, the controller 22 determines whether the question of step S102 has been answered. When the question has not been answered, the process repeats step S103. When the question has been answered, the process proceeds to step S104.

In step S104, the controller 22 associates the image of the face captured in step S102 with the answer to the question detected in step S103 as user information and stores them in the memory 21. After the storing, the process proceeds to step S105.

The controller 22 determines whether the controller 22 can communicate with the charging stand 12 in step S105. When the controller 22 cannot communicate with the charging stand 12, the process proceeds to step S106. When the controller 22 can communicate with the charging stand 12, the process proceeds to step S107.

In step S106, the controller 22 displays a message requesting an action that enables communication with the charging stand 12 on the display 19. The message requesting an action that enables communication may be, for example, "Mount the mobile terminal on the charging stand" in the configuration in which the mobile terminal 11 and the charging stand 12 perform wired communication. The message requesting an action that enables communication may be, for example, "Move the mobile terminal close to the charging stand" in the configuration in which the mobile terminal 11 and the charging stand 12 perform wireless communication. After the message has been displayed, the process returns to step S105.

In step S107, the controller 22 transfers the image of the face stored in step S104 and the user information to the charging stand 12. Also, the controller 22 displays an indication that the transfer is in progress on the display 19. After the start of the transfer, the process proceeds to step S108.

The controller 22 determines whether a notification of transfer completion is received from the charging stand 12 in step S108. When the notification is not received, the process repeats step S108. When the notification is received, the process proceeds to step S109.

The controller 22 displays an initial setting completion message on the display 19 in step S109. After the initial setting completion message has been displayed, the initial setting ends.

Figure 5:
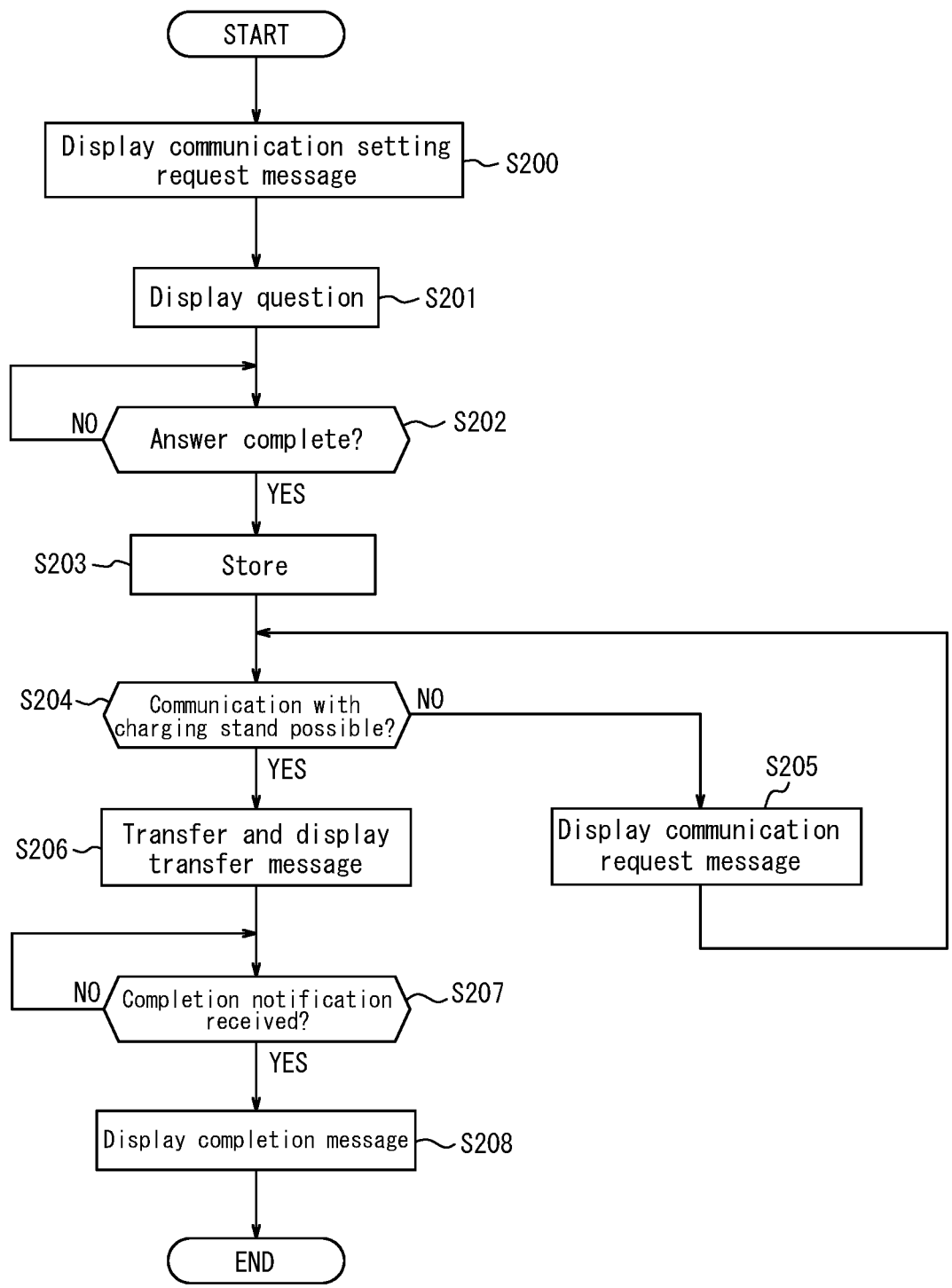
FIG. 5 is a flowchart illustrating a communication setting operation performed by the controller of the mobile terminal illustrated in FIG. 3.

Next, a communication setting operation performed by the controller 22 of the mobile terminal 11 of the present disclosure will be described with reference to the flowchart of FIG. 5. The communication setting operation starts upon detection of user input for starting the communication setting by the input interface 20.

In step S200, the controller 22 displays a message requesting performance of a communication setting to the user on the display 19. The communication setting is a setting of a user's preference and the like used for an interaction. In the communication setting, the user can set that, for example, the user wishes to talk about "Sports" in a dialogue, the user wishes to immediately start a dialogue about "Learning", the user is not particularly interested in "Athletics", as described above. After displaying the message on the display 19, the process proceeds to step S201.

In step S201, the controller 22 displays a question asking, for example, the user's favorite topics, things the user like, things the user does not like, things the user wishes to start immediately, or the like. After displaying the question, the process proceeds to step S202.

In step S202, the controller 22 determines whether the question in step S201 has been answered. When the question has not been answered, the process repeats step S202. When the question has been answered, the process proceeds to step S203.

In step S203, the controller 22 stores the answer detected in step S202 in association with the question in the memory 21. After storing, the process proceeds to step S204.

In step S204, the controller 22 determines whether the controller 22 can communicate with the charging stand 12. When the controller 22 cannot communicate with the charging stand 12, the process proceeds to step S205. When the controller 22 can communicate with the charging stand 12, the process proceeds to step S206.

In step S205, the controller 22 displays a message requesting an action that enables communication with the charging stand 12 on the display 19. The message requesting an action that enables communication is, for example, the message "Mount on the charging stand" for a configuration in which the communication interface 13 performs wired communication with the charging stand 12. The message requesting an action that enables communication is, for example, the message "Move close to the charging stand 12" for a configuration in which the communication interface 13 performs wireless communication with the charging stand 12. After the message has been displayed, the process returns to step S204.

In step S206, the controller 22 transfers the setting information stored in step S203 to the charging stand 12. Also, the controller 22 displays a message indicating the transfer on the display 19. After the transfer has started, the process proceeds to step S207.

In step S207, the controller 22 determines whether a transfer completion notification has been received from the charging stand 12. When the transfer completion notification has not been received, the process repeats step S207. When the transfer completion notification has been received, the process proceeds to step S208.

In step S208, the controller 22 displays a message indicating completion of the communication setting on the display 19. After the message has been displayed, the communication setting operation ends.

Figure 6:
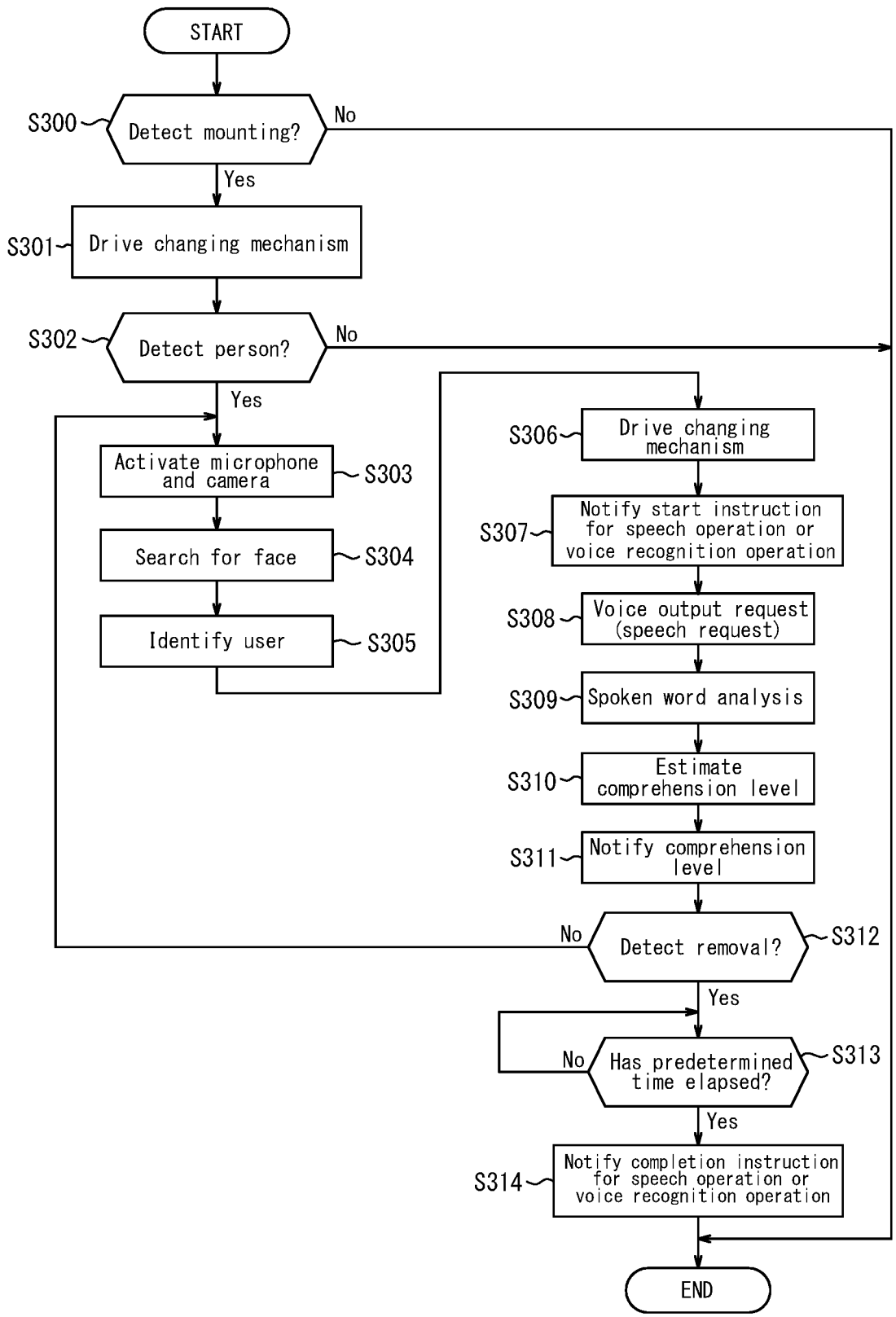
FIG. 6 is a flowchart illustrating a speech execution determination operation performed by a controller of the charging stand illustrated in FIG. 3.

Next, a speech execution determination operation performed by the controller 32 of the charging stand 12 according to the present disclosure will be described with reference to the flowchart of FIG. 6. The controller 32 may periodically start the speech execution determination operation.

In step S300, the controller 32 determines whether the mount sensor 30 has detected mounting of the mobile terminal 11. When the mount sensor 30 has detected mounting, the process proceeds to step S301. When the mount sensor 30 has not detected mounting, the speech execution determination operation ends.

In step S301, the controller 32 drives the changing mechanism 25 and the motion sensor 29 to detect the presence or absence of a person in the vicinity of the charging stand 12. After the changing mechanism 25 and the motion sensor 29 are driven, the process proceeds to step S302.

In step S302, the controller 32 determines whether the motion sensor 29 has detected the presence of a person in the vicinity of the charging stand 12. When the motion sensor 29 has detected the presence of a person, the process proceeds to step S303. When the motion sensor 29 has not detected the presence of a person, the speech execution determination operation ends.

The controller 32 causes the microphone 26 to detect voice and causes the camera 28 to capture an image in step S303. After the detected voice and image are acquired, the process proceeds to step S304.

In step S304, the controller 32 searches for a face of the person included in the image captured in step S303. After the search for the face, the process proceeds to step S305.

In step S305, the controller 32 compares the face searched in step S304 with an image of a registered face stored in the memory 31 and thus identifies the user targeted for interaction. Also, the controller 32 locates the face of the user targeted for interaction in the image. After identification, the process proceeds to step S306.

In step S306, the controller 32 drives the changing mechanism 25 such that the display 19 of the mobile terminal 11 is directed to the direction of the face of the user targeted for interaction, based on the location of the face detected in step S305. After the changing mechanism 25 has been driven, the process proceeds to step S307.

In step S307, the controller 32 notifies the mobile terminal 11 of an instruction to start at least one of the speech operation and the voice recognition operation. After notifying the mobile terminal 11, the process proceeds to step S308.

In step S308, the controller 32 transmits a voice output request (i.e., an interaction request corresponding to a first voice output request) to the mobile terminal 11. The interaction to be output may contain, for example, the topic preferred by the user according to the setting information, or the content specified by the user. After transmitting the interaction request, the process proceeds to step S309. Here, step S308 may be performed again after the comprehension level (step S310) has been estimated by the controller 32. In this case, the voice output request transmitted by the controller 32 may correspond to the second voice output request.

At step S309, the controller 32 acquires the user's response (i.e., the user's voice) to the interaction requested in step S308 from the mobile terminal 11 and performs a speech word analysis. Here, the speech word analysis performed by the controller 32 includes counting the number of instances of a word included in the response from the user and determining whether the user's response includes positive or favorable content. Here, the number of instances of the word may be counted for each of the user's responses. The number of instances of the word may be counted in an accumulating manner so as to include the user's past responses. After performing the speech word analysis, the process proceeds to step S310.

In step S310, the controller 32 estimates the comprehension level of the user, based on a result of the speech word analysis in step S309 and the information linked to the words stored in the memory 31 (the hierarchy indicating the depth of knowledge).

Figure 7:
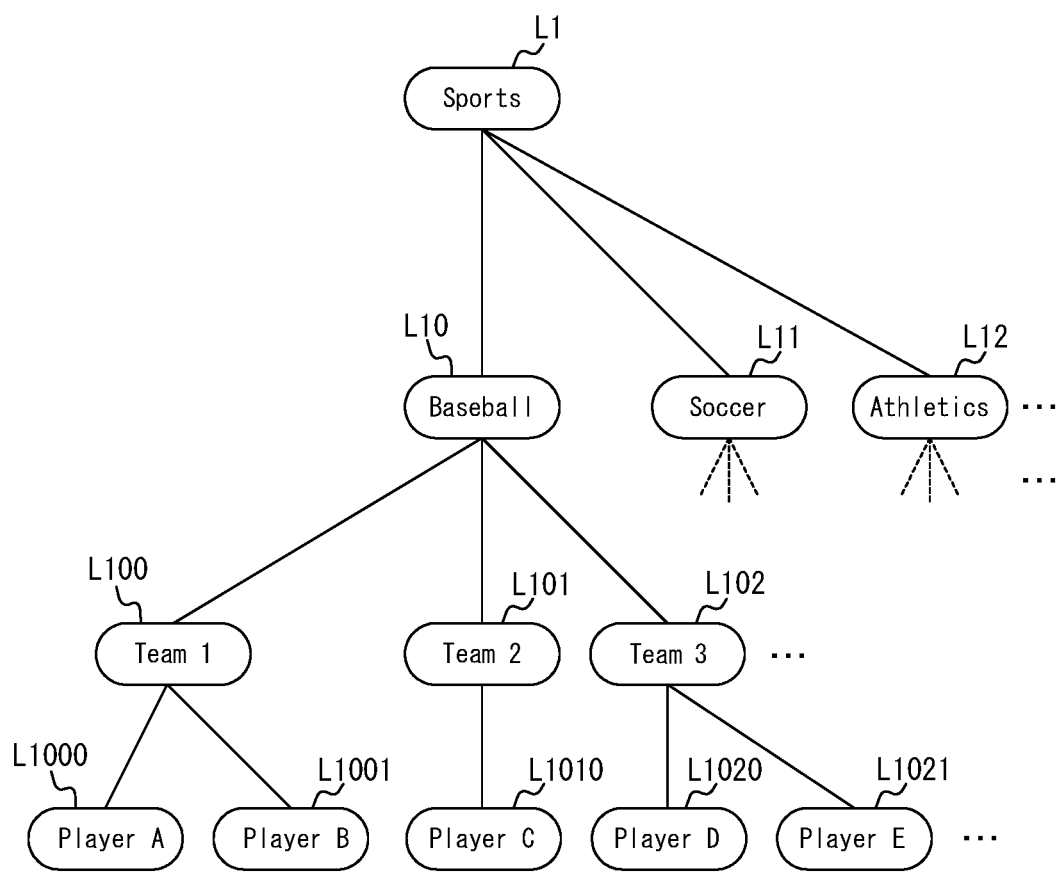
FIG. 7 is a diagram illustrating example knowledge levels of words stored in a memory of the charging stand illustrated in FIG. 3.

Here, FIG. 7 illustrates example words that are stored in the memory 31 and managed based on the hierarchical structure (the tree structure) in accordance with the depth of knowledge. The hierarchical structure is arranged such that the upper hierarchy corresponds to a shallower knowledge level (i.e., general or less difficult), and the lower hierarchy corresponds to a deeper knowledge level (more expert or difficult). In the example of FIG. 7, the word in the top hierarchy (the first hierarchy) is Sports. Sports is associated with a reference sign L1 and will be referred to as Sports [L1]. In the example of FIG. 7, also, Baseball [L10], Soccer [L11], and Athletics [L12] are arranged in the level immediately below (the second hierarchy). In this manner, words associated with one another are managed in a tree structure that includes hierarchies in accordance with the knowledge level. Here, each of the reference signs of the words is constituted by the letter L and a number. The number of digits in each of the reference signs corresponds to the number of hierarchies in which the word associated with the reference sign is arranged.

In the example of FIG. 7, Sports [L1], Baseball [L10], Team 1 [L100], and Player A [L1000] sequentially require a deeper knowledge level from the user. For example, to understand an interaction regarding Player A [L1000], the user needs deeper knowledge than the knowledge required to understand an interaction regarding Team 1 [L100]. The controller 32 estimates the comprehension level of the user by associating the number of instances that a word is mentioned according to the speech word analysis and the hierarchy in which the word is stored in the memory 31. For example, when the number of instances that Player C [L1010] is mentioned is largest, the controller 32 determines that the knowledge level of the user regarding Sports [L1] is the fourth hierarchy (a fourth level). Also, the controller 32 assumes that the user also has knowledge regarding Player A [L1000], Player B [L1001], Player D [L1020], and Player E [L1021], which are words at the same level. The controller 32 also assumes that the user has knowledge regarding Team 2 [L101], Baseball [L10], and Sports [L1], which are words in the upper hierarchies. For example, when the number of instances that Team 2 [L101] is mentioned is largest in the user's responses and, simultaneously, the number of instances that Player C [C1010] arranged in a lower hierarchy is mentioned is zero, the controller 32 estimates the knowledge level of the user regarding Sports [L1] is the third hierarchy (a third level).

The controller 32 may estimate the comprehension level of the user by, for example, associating whether the user's response includes a positive or favorable content with the hierarchy in which the word is stored in the memory 31. For example, in a case in which the user's response includes favorable content in response to an interaction that includes Player A [L1000] (e.g., when the user responses with a content that includes "Player A"), the controller 32 may estimate that the knowledge level of the user regarding Sports [L1] is at the fourth hierarchy (the fourth level). In a case in which the user's response does not include favorable content in response to the interaction that includes Player A [L1000] (e.g., when the user simply responds "Uh-huh"), the controller 32 may estimate that the knowledge level of the user regarding Sports [L1] is at the third hierarchy (the third level), which is immediately above the fourth hierarchy. In the present embodiment, the knowledge level is used as the comprehension level of the user. For example, the comprehension level of the user is expressed as "Sports [L1] is level 3". After estimating the comprehension level, the process proceeds to step S311.

In step S311, the controller 32 notifies the mobile terminal 11 of the comprehension level estimated in step S310. After notification, the process proceeds to step S312.

In step S312, the controller 32 determines whether the mount sensor 30 detects removal of the mobile terminal 11. When the mount sensor 30 has not detected removal, the process returns to step S303. When the mount sensor 30 has detected removal, process proceeds to step S313.

In step S313, the controller 32 determines whether a predetermined time has elapsed since removal was detected. When the predetermined time has not elapsed, the process returns to step S313. When the predetermined time has elapsed, the process proceeds to step S314.

In step S313, the controller 32 notifies the mobile terminal 11 of an instruction to complete at least one of the speech operation and the voice recognition operation.

Figure 8:
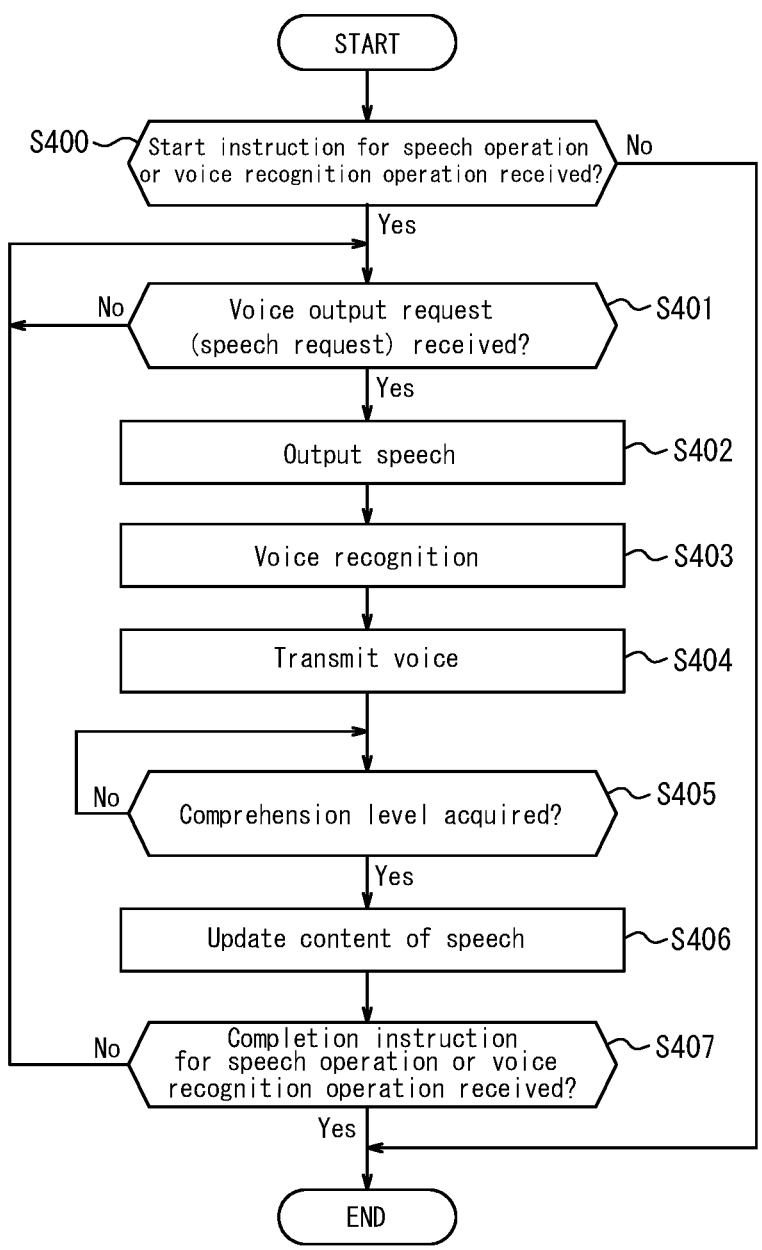
FIG. 8 is a flowchart illustrating a speech operation performed by the controller of the mobile terminal illustrated in FIG. 3.

Next, a speech operation performed by the controller 22 of the mobile terminal 11 according to the present disclosure will be described with reference to the flowchart of FIG. 8. The controller 22 may periodically start the speech operation.

In step S400, the controller 22 receives an instruction for starting execution of at least one of the speech operation and the voice recognition operation from the charging stand 12. After receiving the instruction, the process proceeds to step S401. When the instruction is not received, the controller 22 ends the speech operation.

In step S401, the controller 22 receives a speech request from the charging stand 12. After receiving the speech request, the process proceeds to step S402. When the controller 22 does not receive the speech request, the process returns to step S401.

In step S402, the controller 22 outputs a speech to the user targeted for interaction (for example, a speech "Player A got a hit"). After the speech, the process proceeds to step S403.

In step S403, the controller 22 performs speech recognition for recognizing the user's response (e.g., speech such as "Player A has a top batting average in the league" or voice such as "Uh-huh") to the speech of step S402. After the speech recognition, the process proceeds to step S404.

In step S404, the controller 22 transmits the response from the user (the user's voice) to the charging stand 12. After transmission, the process proceeds to step S405.

In step S405, the controller 22 acquires the comprehension level from the charging stand 12. After acquiring the comprehension level, the process proceeds to step S406. When the controller 22 does not acquire the comprehension level, the process returns to step S405.

In step S406, the controller 22 updates the speech content, based on the comprehension level acquired from the charging stand 12. Updating the speech content is an operation in which the content of the next speech is changed in accordance with the comprehension level such that the content matches the knowledge level of the user. The controller 22 updates the content of the speech, based on the hierarchy of words that are stored in the memory 21 and shared with the charging stand 12. For example, when the acquired comprehension level is "Sports [L1] is level 4", the controller 22 includes different information regarding Player A [L1000] or information regarding another player at the same knowledge level in the content of the next speech. For example, when the acquired comprehension level is "Sports [L1] is level 2", the controller 22 changes the content of the next speech to a general matter (e.g., "Check yesterday's baseball news"), or changes the subject. Here, the controller 22 may change the content of the next speech to an explanation of a word which the controller 22 estimates that the user does not know, in accordance with the acquired comprehension level. For example, in a case in which the acquired comprehension level corresponding to the knowledge level drops after a speech regarding Player A, the controller 22 may change the content of the next speech to an explanation of Player A (e.g., "Player A is a catcher and has a high on-base percentage"). After updating the content of the next speech, the process proceeds to step S407.

In step S407, the controller 22 receives an instruction to end the execution of at least one of the speech operation and the voice recognition operation from the charging stand 12. When the controller 22 receives the instruction, the controller 22 ends the speech process. When the controller 22 does not receive the instruction, the process returns to step S401.

The electronic device (including the charging stand 12) according to the present embodiment configured as described above performs the speech word analysis based on a user's speech, after performing the first voice output request. The electronic device estimates the comprehension level of the user, based on the information (the hierarchical structure in accordance with the depth of knowledge) linked to the word stored in the memory and a result of the speech word analysis. Then, the electronic device performs the second voice output request (using the updated speech content) in accordance with the comprehension level of the user. Preferably, the communication system 10 interacts with the user using speech content appropriate for the user. In conversations with various users, however, it is necessary to consider the knowledge level of each of the users. The electronic device according to the present embodiment configured as described above can have conversations with various users and, further, use appropriate content that matches the knowledge level of each of the users. Thus, the electronic device of the present embodiment has improved functionality, as compared with conventional electronic devices.

When the mobile terminal 11 is mounted on the charging stand 12, the controller 32 of the charging stand 12 performs the speech word analysis, the estimation of the comprehension level, and the voice output request described above. Generally, the user of the mobile terminal 11 is likely to start charging the mobile terminal 11 soon after coming home. Thus, the user can interact with the electronic device using appropriate content which matches the knowledge level of the user at an appropriate timing such as when the user comes home.

When the mobile terminal 11 is mounted on the charging stand 12 according to the present embodiment, the charging stand 12 causes the mobile terminal 11 to perform at least one of the speech operation and the voice recognition operation. The charging stand 12 with the above configuration can function as a conversation partner for a user, together with the mobile terminal 11 that executes predetermined functions on its own. Thus, the charging stand 12 can function to keep company with elderly persons living alone when they have a meal, and prevent them from feeling lonely. Thus, the charging stand 12 has improved functionality as compared to conventional charging stands.

The charging stand 12 according to the present embodiment causes the mobile terminal 11 to start at least one of the speech operation and the voice recognition operation when the mobile terminal 11 is mounted on the charging stand 12.

Thus, the charging stand 12 can cause the mobile terminal 11 to start an interaction with a user simply in response to mounting of the mobile terminal 11 on the charging stand 12, without the necessity for a complicated input operation.

The charging stand 12 according to the present embodiment causes the mobile terminal 11 to end at least one of the speech operation and the voice recognition operation when the mobile terminal 11 is removed. Thus, the charging stand 12 can end an interaction with a user simply in response to removal of the mobile terminal 11, without the necessity for a complicated input operation.

The charging stand 12 according to the present embodiment drives the changing mechanism 25 such that the display 19 of the mobile terminal 11 is directed to the user targeted for interaction concerned in at least one of the speech operation and the voice recognition operation. Thus, the charging stand 12 can enable the user to feel as if the communication system 10 is a person during an interaction with the user.

The charging stand 12 according to the first embodiment can enable different mobile terminals 11 that communicate with the charging stand 12 to share the content of a conversation with a user. The charging stand 12 configured in this manner can enable another user to know the content of a conversation with a specific user. Thus, the charging stand 12 can enable a family member at a remote location to share the content of the conversation and facilitate communication within the family.

The charging stand 12 according to the present embodiment determines a state of a specific target and, when determines that there is an abnormal state, notifies the user of the mobile terminal 11 to that effect. Thus, the charging stand 12 can watch over the specific target.

The communication system 10 according to the present embodiment determines speech to output to a user targeted for interaction, based on the content of past conversations, voice, an installation location of the charging stand 12, or the like. Thus, the communication system 10 having the above configuration can output a conversation corresponding to the content of a current conversation of the user, the content of a past conversation by the user, or the installation location of the charging stand 12.

The communication system 10 according to the present embodiment can learn the behavior history of a specific user and output advice to the user. The communication system 10 having the above configuration can notify times for taking medicine, suggestions for meals that match the user's preferences, suggestions for a healthy diet for the user, or suggestions for effective and sustainable exercises for the user. Thus, the communication system 10 can remind the user of something that is easily forgotten or make the user aware of something in the near future.

Further, the communication system 10 according to the present embodiment notifies information associated with the current location. The communication system 10 having this configuration can inform the user of local information specific to the neighborhood of the user's home.

Although the disclosure has been described based on the drawings and the embodiments, it is to be understood that various changes and modifications may be implemented based on the present disclosure by those who are ordinarily skilled in the art. Accordingly, such changes and modifications are included in the scope of the disclosure.

Figure 9:
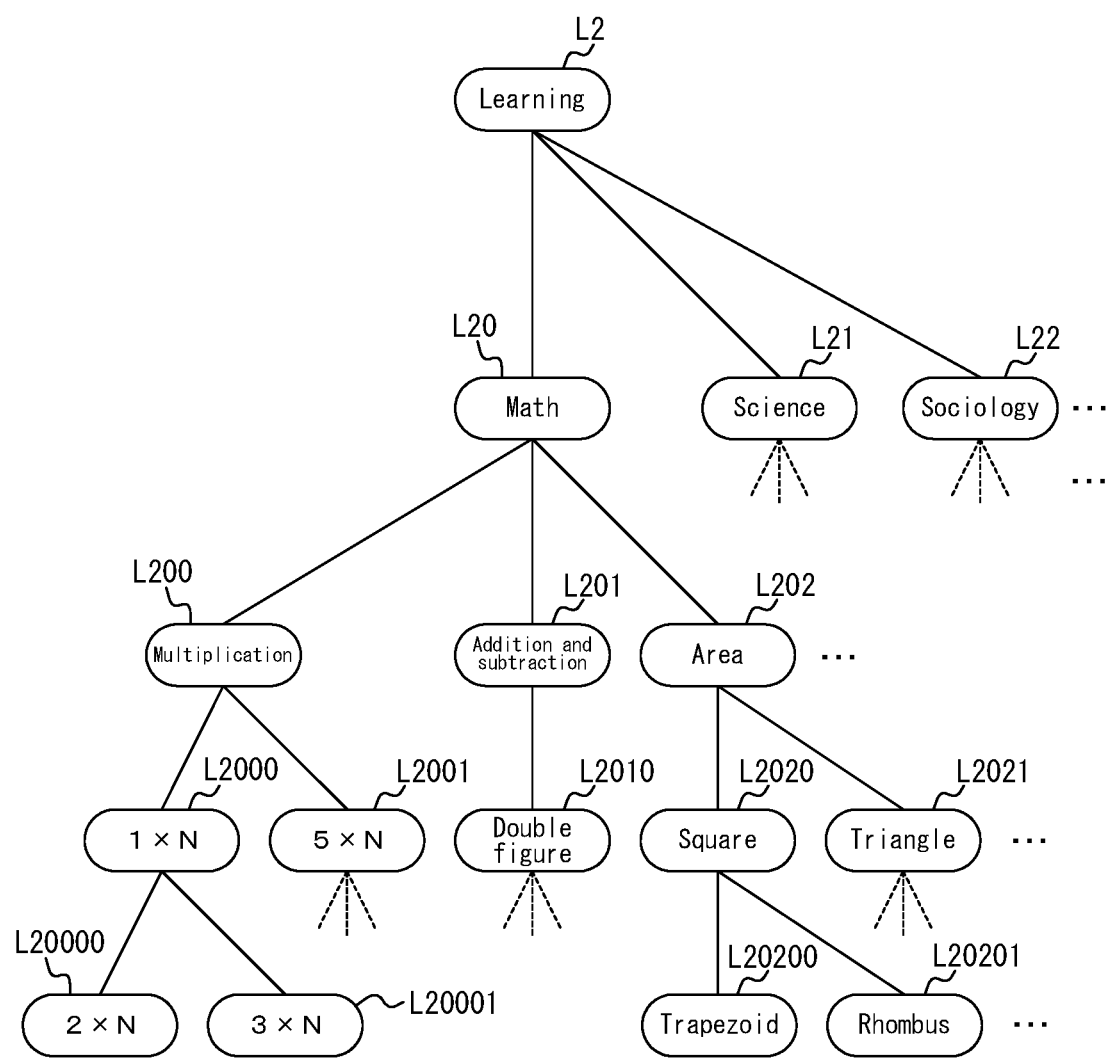
FIG. 9 is a diagram illustrating other example knowledge levels of words stored in the memory of the charging stand illustrated in FIG. 3.

In the present embodiment, for example, the managed words in the hierarchical structure are words to be directly used in speech. Here, the managed words are not limited to words to be directly used in speech and may include, for example, words indicating a field, a group, or a hierarchy. For example, FIG. 9 illustrates example words associated with learning that are managed in a hierarchical structure in accordance with depth of knowledge (a difficulty level). The words used in the hierarchical structure of FIG. 9 indicate a field or a group of the speech content, rather than words to be directly used in speech. The hierarchical structure is arranged such that the upper hierarchy corresponds to a lower difficulty level, and a lower hierarchy corresponds to a higher difficulty level. In the example of FIG. 9, however, each of the first to third levels indicates a category which is not directly related to the difficulty level. For example, Multiplication [L200] indicates the learning of single digit multiplications (the so-called multiplication table), and 2×N [L20000] and 3×N [L20001] which correspond to higher difficulty levels than 1×N [L2000] and 5×N [L2001] are arranged in lower hierarchies. Here, the hierarchical structure of FIG. 9 is illustrated by way of example only and, for example, a hierarchical structure using hierarchies (e.g., a structure in which a second hierarchy is arranged immediately below a first hierarchy) or a hierarchical structure using school years (e.g., a second year is arranged immediately below a first year) may also be used.

Figure 10:
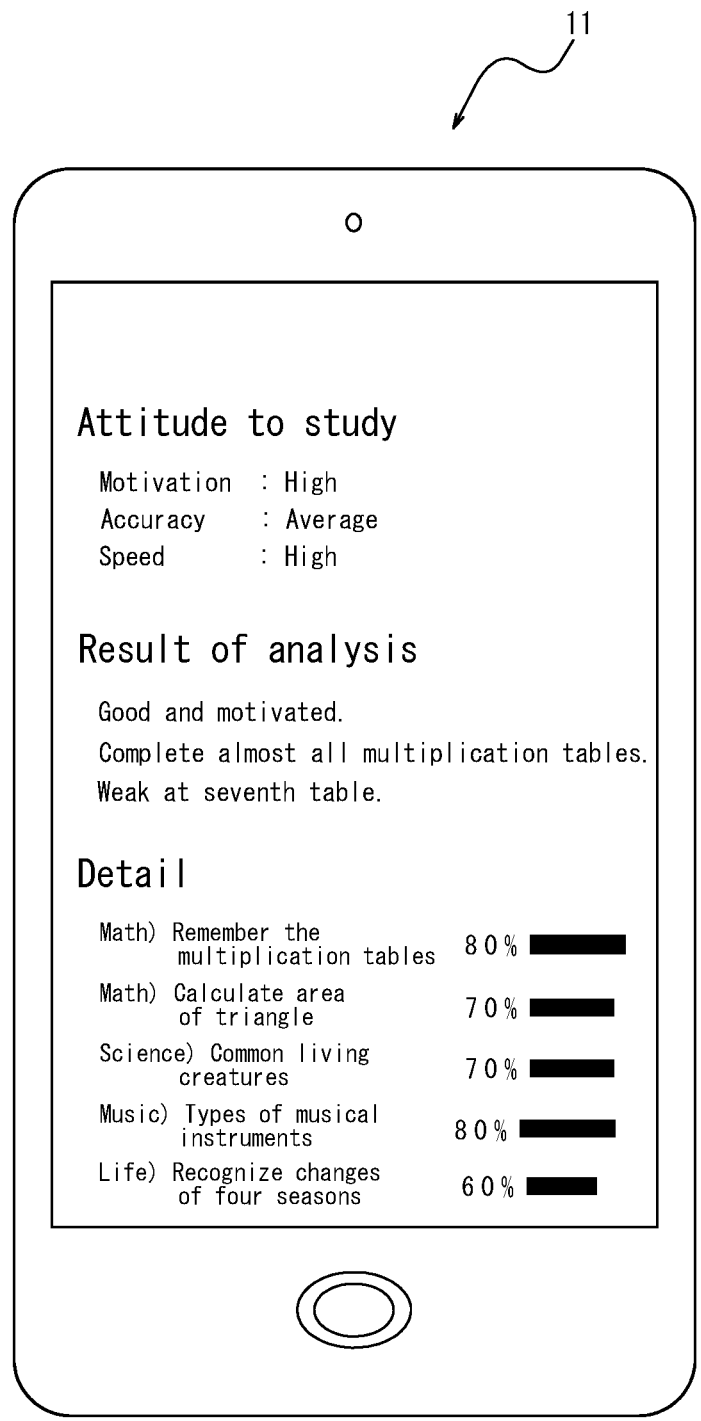
FIG. 10 is a diagram illustrating an example learning report.

In the example variation, when the controller 32 recognizes that the user wishes to start an interaction regarding "Learning" based on the setting information shared with the mobile terminal 11, the controller 32 estimates a comprehension level of the user (e.g., a child) using the hierarchical structure illustrated in FIG. 9. In the example variation, the controller 32 performs the speech word analysis including, analysis of correct and incorrect answers. For example, in a case in which the field of speech content is 2×N [L20000], the controller 32 acquires voice information regarding questions and answers in the field from the memory 31. Here, the voice information regarding the questions and the answers stored in the memory 31 is shared with the mobile terminal 11. The mobile terminal 11 performs questioning based on, for example, the shared voice information. In the speech word analysis, the controller 32 determines whether answers given by the user to the presented (spoken) question are correct or incorrect, by comparing the answers to the stored answers. For example, when the presented question is 2×2, the controller 32 determines that the user is correct when the user's response is "4", or the controller 32 determines that the user is incorrect when the user's response is otherwise. Then, the controller 32 stores the determination result in association with the user and the field (the field of learning) in the memory 31. Based on the stored determination result, the controller 32 can calculate an accuracy rate for each field. Further, the controller 32 acquires the time taken from the question to the answer as measured by the mobile terminal 11 and stores the acquired time in association with the user in the memory 31. The controller 32 can calculate an answering speed of the user, based on the stored time. Also, the controller 32 can determine a learning motivation level (motivation), depending on whether the content of a user's speech includes a negative word (e.g., "hate"). As illustrated in FIG. 10, then, the controller 32 may create a report regarding the accuracy level, the speed, and the motivation for each field and transmit the report to a mobile terminal of a family member (e.g., a parent) of the user via the communication interface 23.

In the example variation, here, the comprehension level of the user is determined based on the word indicating the learning field (e.g. 2×N [L20000]) and the accuracy rate (e.g., 10%). After acquiring the comprehension level, the mobile terminal 11 may change the content of a next speech in accordance with the accuracy rate. For example, the mobile terminal 11 may update the speech content when the accuracy level is low (e.g., less than 50%), so as to present a less difficult question. The comprehension level of the user may be determined further based on at least one of the speed and the motivation. For example, when the speed is slow (e.g. slower than data of a previous day), the mobile terminal 11 may update the speech content to present a less difficult question. The electronic device of the example variation can enable the user to learn appropriately in accordance with the knowledge level.

In the present embodiment, for example, although the controller 22 of the mobile terminal 11 performs the speech operation and the voice recognition operation using the content in accordance with the comprehension level, the controller 32 of the charging stand 12 may perform these operations. In a configuration in which the controller 32 of the charging stand 12 performs these operations, the microphone 26, the speaker 27, and the camera 28 of the charging stand 12 may be activated, and the microphone 16, the speaker 17, and the camera 18 of the mobile terminal 11 may be activated via the communication interfaces 23 and 13, during an interaction with the user.

In the present embodiment, at least some of the operations performed by the controller 32 of the charging stand 12 (e.g., the speech word analysis operation, the estimation of the comprehension level, or the like) may be performed by the controller 22 of the mobile terminal 11.

In the present embodiment, the example variation described above may be combined, such that the controller 32 of the charging stand 12 performs the speech operation and the voice recognition operation, and the controller 22 of the mobile terminal 11 performs the speech word analysis and the estimation of the comprehension level.

Further, although the controller 22 of the mobile terminal 11 performs the registration operation in the present embodiment, the controller 32 of the charging stand 12 may perform the registration operation.

In the above embodiment, the hierarchical structure of words related to each other is arranged such that the upper hierarchy corresponds to a lower knowledge level, and the lower hierarchy corresponds to a higher knowledge level, by way of example. Here, regardless of the depth of the hierarchical structure, the knowledge level of each node may be set in any manner. For example, a case in which Science is arranged in the top hierarchy (the first hierarchy), and Chemical and Physics are set as words (fields) arranged in the hierarchy immediately below (the second hierarchy) will be considered. For example, when a subject classified as Level 1 of Chemical is arranged in the third hierarchy, a subject classified as Level 1 of Physics may be arranged in the fourth hierarchy or lower. Such a hierarchical structure enables level adjustment across units or fields (Chemical and Physics in the above example). Further, such a hierarchical structure facilitates level adjustment in a case in which a subject is arranged in an upper hierarchy in one field and includes the specialized content.

The network used herein includes, unless otherwise specified, the Internet, an ad hoc network, LAN (Local Area Network), WAN (Wide Area Network), MAN (Metropolitan Area Network), a cellular network, WWAN (Wireless Wide Area Network), WPAN (Wireless Personal Area Network), PSTN (Public Switched Telephone Network), terrestrial wireless network (Terrestrial Wireless Network), other network, or any combination thereof. An element of the wireless network includes, for example, an access point (e.g., a Wi-Fi access point), a Femtocell, or the like. Further, a wireless communication apparatus may connected to a wireless network that uses Wi-Fi, Bluetooth, a cellular communication technology (e.g. CDMA (Code Division Multiple Access), TDMA (Time Division Multiple Access), FDMA (Frequency Division Multiple Access), OFDMA (Orthogonal Frequency Division Multiple Access), SC-FDMA (Single-Carrier Frequency Division Multiple Access)), or other wireless technologies and/or technical standards. The network can employ one or more technologies, such as UTMS (Universal Mobile Telecommunications System), LTE (Long Term Evolution), EV-DO (Evolution-Data Optimized or Evolution-Data), GSM® (Global System for Mobile communications, GSM is a registered trademark in Japan, other countries, or both), WiMAX (Worldwide Interoperability for Microwave Access), CDMA-2000 (Code Division Multiple Access-2000), or TD-SCDMA (Time Division Synchronous Code Division Multiple Access).

Circuit configurations of the communication interfaces 13 and 23 provide functionality by using various wireless communication network such as, for example, WWAN, WLAN, WPAN, or the like. WWAN may include CDMA network, TDMA network, FDMA network, OFDMA network, SC-FDMA network, or the like. CDMA network may implement one or more RAT (Radio Access Technology) such as CDMA2000, Wideband-CDMA (W-CDMA), or the like. CDMA2000 includes a standard such as IS-95, IS-2000, or IS-856. TDMA network may implement RAT such as GSM, D-AMPS (Digital Advanced Phone System), or the like. GSM and W-CDMA are described in documents issued by a consortium called 3rd Generation Partnership Project (3GPP). CDMA2000 is described in documents issued by a consortium called 3rd Generation Partnership Project 2 (3GPP2). WLAN may include IEEE802.11x network. WPAN may include Bluetooth network, IEEE802.15x, or other types of network. CDMA may be implemented as a wireless technology such as UTRA (Universal Terrestrial Radio Access) or CDMA2000. TDMA may be implemented by using a wireless technology such as GSM/GPRS (General Packet Radio Service)/EDGE (Enhanced Data Rates for GSM Evolution). OFDMA may be implemented by a wireless technology such as IEEE (Institute of Electrical and Electronics Engineers) 802.11 (Wi-Fi), IEEE802.16 (WiMAX), IEEE802.20, E-UTRA (Evolved UTRA), or the like. These technologies can be used for any combination of WWAN, WLAN and/or WPAN. Also, these technologies may be implemented to use UMB (Ultra Mobile Broadband) network, HRPD (High Rate Packet Data) network, CDMA20001X network, GSM, LTE (Long-Term Evolution), or the like.

The memories 21 and 31 described above may store appropriate data structures and sets of computer instructions such as program modules that are used to cause a processor to perform the techniques disclosed herein. A computer-readable medium includes electrical connection through one or more wires, a magnetic disk storage, a magnetic cassette, a magnetic tape, another magnetic or optical storage device (e.g., CD (Compact Disk), Laser Disc® (Laser Disc is a registered trademark in Japan, other countries, or both), DVD (Digital Versatile disc), Floppy Disk, or Blu-ray Disc), a portable computer disk, RAM (Random Access memory), ROM (Read-Only memory), EPROM, EEPROM, a ROM such as a flash memory which is rewritable and programmable, other tangible storage media capable of storing information, or any combination thereof. The memory may be provided within and/or external to the processor/processing unit. As used herein, the term "memory" means any kind of a long-term storage, a short-term storage, a volatile memory, a nonvolatile memory, or other memories, and does not limit a type of a memory, the number of memories, and a type of a medium for storing.

Note that a system as disclosed herein includes various modules and/or units configured to perform a specific function, and these modules and units are schematically illustrated to briefly explain their functionalities and do not specify particular hardware and/or software. In that sense, these modules, units, and other components simply need to be hardware and/or software configured to substantially perform the specific functions described herein. Various functions of different components may be realized by any combination or subdivision of hardware and/or software, and each of the various functions may be used separately or in any combination. Further, an input/output device, an I/O device, or user interface configured as, and not limited to, a keyboard, a display, a touch screen, and a pointing device may be connected to the system directly or via an intermediate I/O controller. Thus, various aspects of the present disclosure may be realized in many different embodiments, all of which are included within the scope of the present disclosure.

REFERENCE SIGNS LIST 10 communication system
11 mobile terminal
12 charging stand
13 communication interface
14 power receiving unit
15 battery
16 microphone
17 speaker
18 camera
19 display
20 input interface
21 memory
22 controller
23 communication interface
24 power supply unit
25 changing mechanism
26 microphone
27 speaker
28 camera
29 motion sensor
30 mount sensor
31 memory
32 controller

The invention claimed is:

1. An electronic device comprising:
a controller configured to:
perform a first voice output request;
perform a speech word analysis based on a voice of a user after performing the first voice output request;
estimate a comprehension level of the user based on a hierarchy of speech content indicating a depth of knowledge linked to a word stored in a memory and based on a result of the speech word analysis; and
perform a second voice output request in accordance with the comprehension level of the user,
wherein the controller is configured to further estimate the comprehension level based on a number of instances that the word is mentioned according to the result of the speech word analysis.

2. An electronic device comprising:
a controller configured to:
perform a first voice output request;
perform a speech word analysis based on a voice of a user after performing the first voice output request;
estimate a comprehension level of the user based on a hierarchy of speech content indicating a depth of knowledge linked to a word stored in a memory and based on a result of the speech word analysis; and
perform a second voice output request in accordance with the comprehension level of the user,
wherein the controller is configured to perform the speech word analysis, estimate the comprehension level, and perform the second voice output request, when a mobile terminal, configured to output the first voice output request and the second voice output request is mounted on a charging stand.

3. A charging stand comprising:
a controller configured to:
perform a first voice output request;
perform a speech word analysis based on a voice of a user after performing the first voice output request;
estimate a comprehension level of the user based on a hierarchy of speech content indicating a depth of knowledge linked to a word stored in a memory and based on a result of the speech word analysis; and
perform a second voice output request in accordance with the comprehension level of the user,
wherein the controller is configured to further estimate the comprehension level based on a number of instances that the word is mentioned according to the result of the speech word analysis.

4. A charging stand comprising:
a controller configured to:
perform a first voice output request;
perform a speech word analysis based on a voice of a user after performing the first voice output request;
estimate a comprehension level of the user based on a hierarchy of speech content indicating a depth of knowledge linked to a word stored in a memory and based on a result of the speech word analysis; and
perform a second voice output request in accordance with the comprehension level of the user,
wherein the controller is configured to perform the speech word analysis, estimate the comprehension level, and perform the second voice output request, when a mobile terminal, configured to output the first voice output request and the second voice output request is mounted on the charging stand.

5. The electronic device according to claim 1,
wherein the controller is configured to perform the speech word analysis, estimate the comprehension level, and perform the second voice output request, when a mobile terminal, configured to output the first voice output request and the second voice output request is mounted on a charging stand.

6. The charging stand according to claim 3,
wherein the controller is configured to perform the speech word analysis, estimate the comprehension level, and perform the second voice output request, when a mobile terminal, configured to output the first voice output request and the second voice output request is mounted on the charging stand.

* * * * *